May 16, 1967  J. R. KLOOSTER  3,319,608
PIG HANDLING ASSEMBLY
Filed Oct. 24, 1965  6 Sheets-Sheet 2
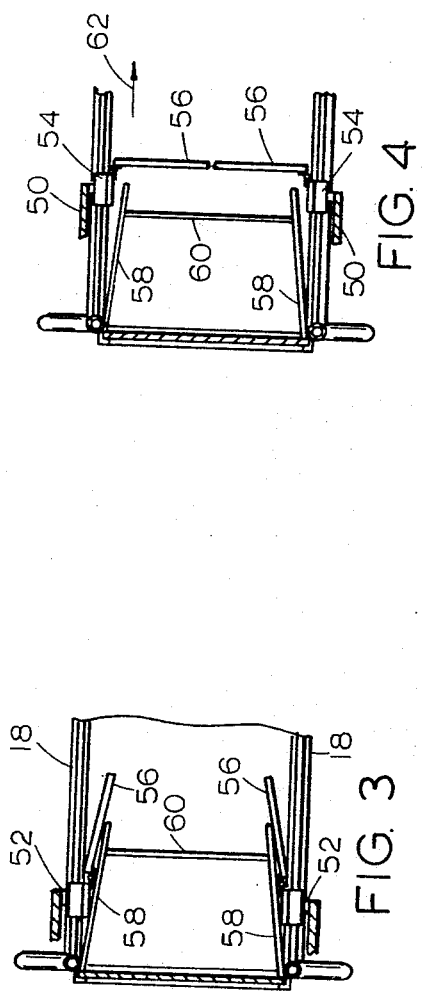
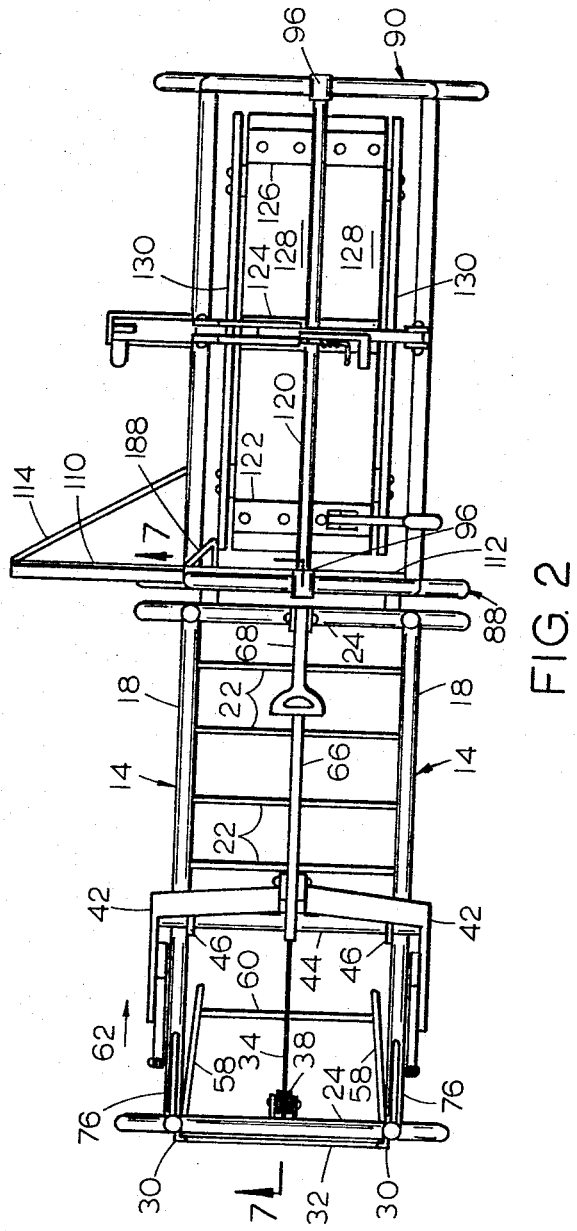
INVENTOR.
JOHN R. KLOOSTER
BY May 16, 1967  J. R. KLOOSTER  3,319,608
PIG HANDLING ASSEMBLY
Filed Oct. 24, 1965  6 Sheets-Sheet 3

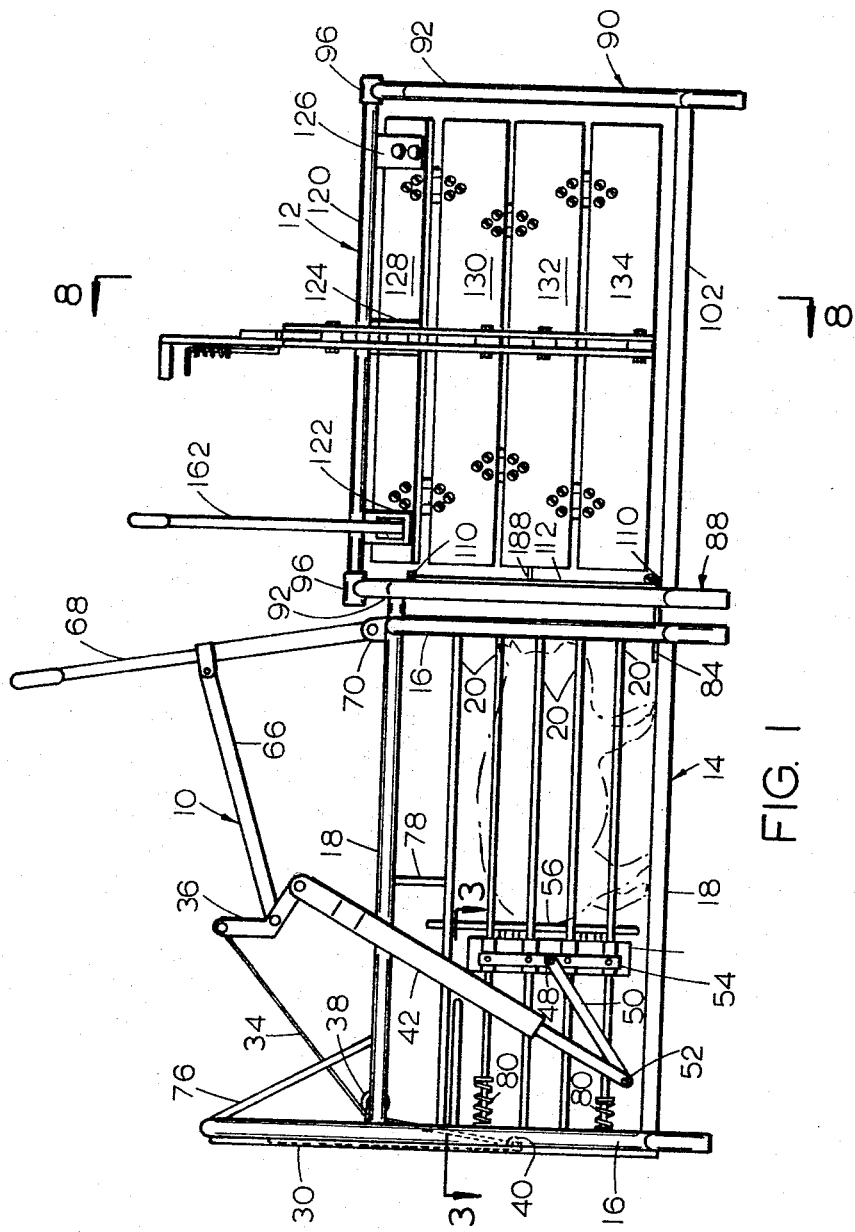

INVENTOR.
JOHN R. KLOOSTER

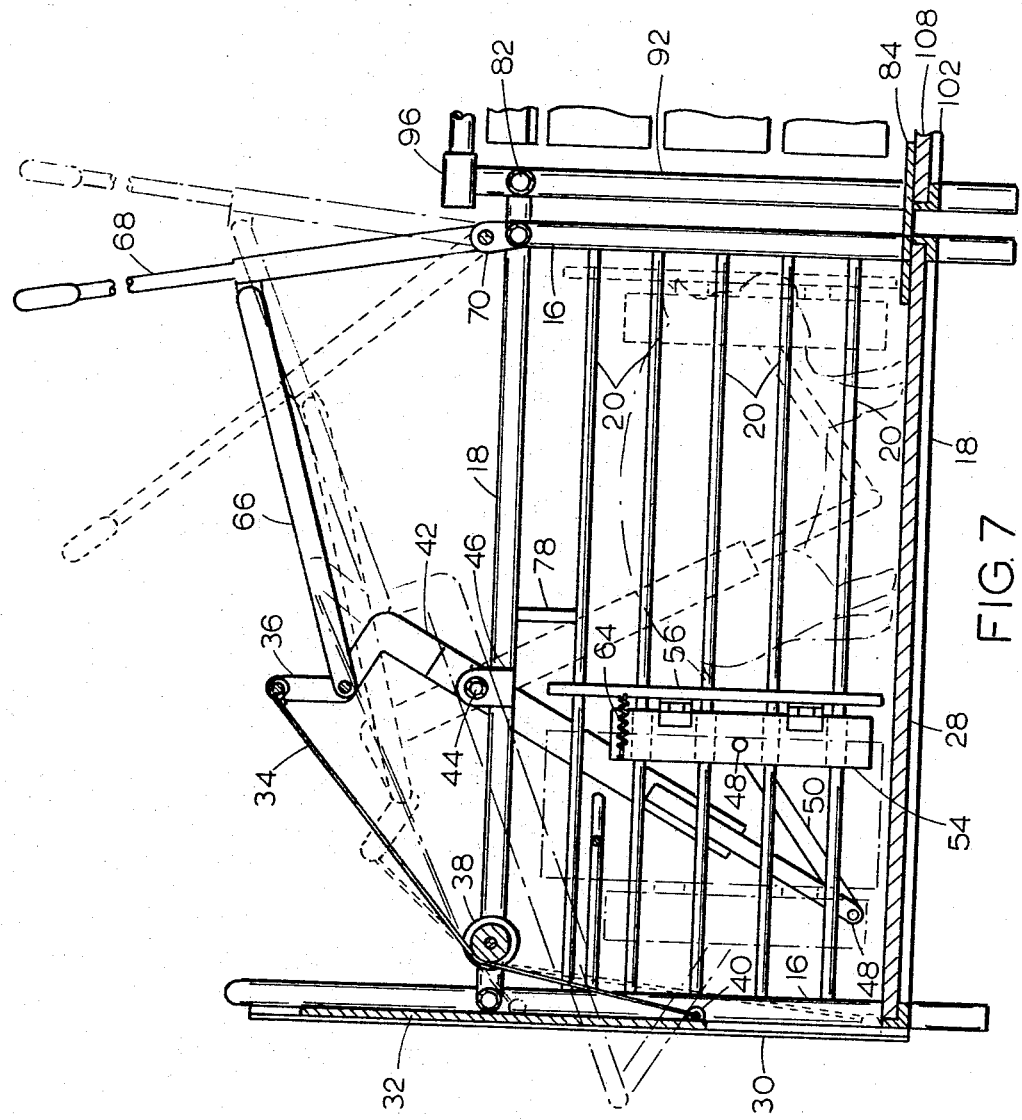

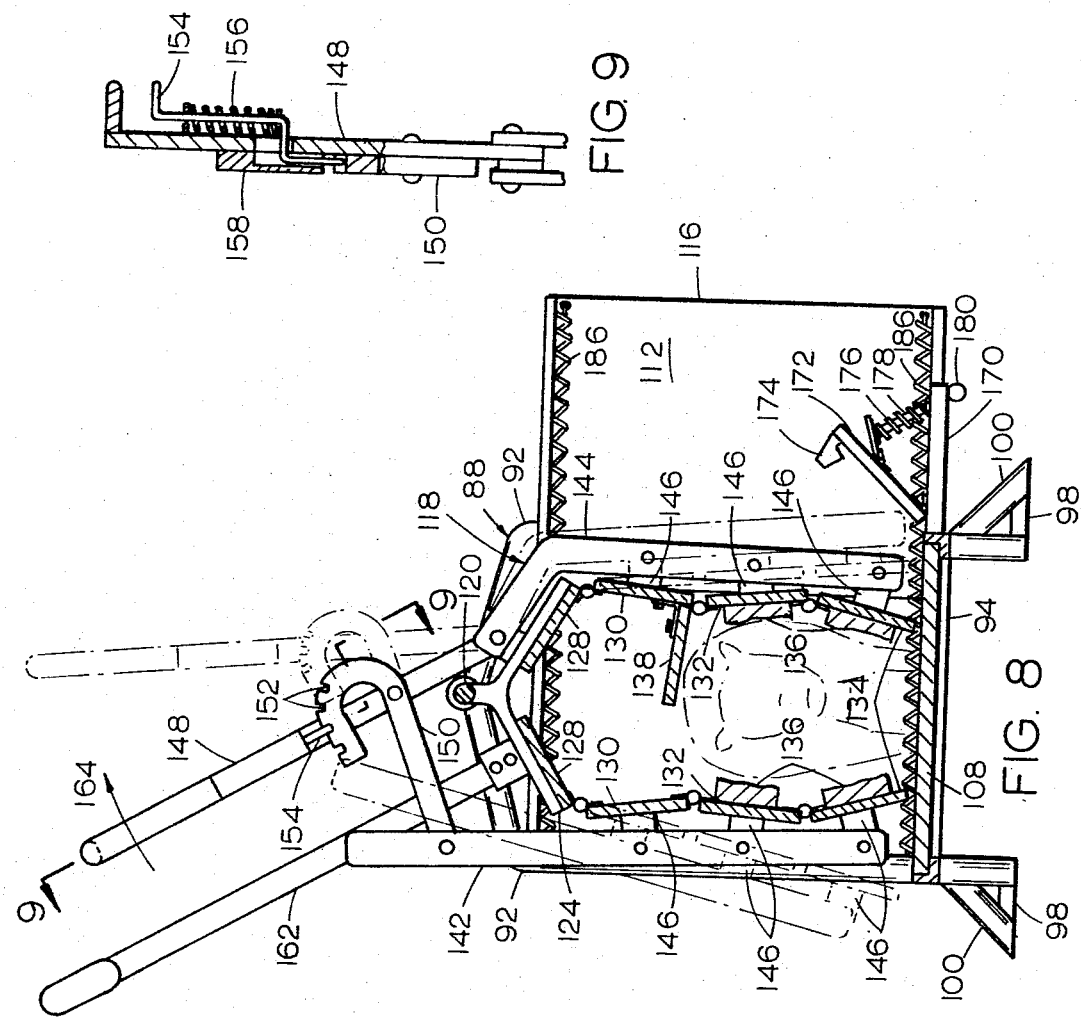

May 16, 1967  J. R. KLOOSTER  3,319,608
PIG HANDLING ASSEMBLY
Filed Oct. 24, 1965  6 Sheets-Sheet 6

John R. Klooster,
INVENTOR.
By Hiram A. Sturges,
Agent

United States Patent Office 3,319,608
Patented May 16, 1967

3,319,608
PIG HANDLING ASSEMBLY
John R. Klooster, Rte. 1, Britt, Iowa 50423
Filed Oct. 24, 1965, Ser. No. 504,647
5 Claims. (Cl. 119—98)

This invention relates to pig handling assemblies and more particularly it is an object of this invention to provide a pig handling assembly which is more automatic than heretofore for reducing the labor cost in the handling of pigs for treatment.

A further object of this invention is to provide an assembly as described having a vestibule section for holding a pig awaiting its turn for treatment and a pig tilting section by the vestibule section in a position to receive a pig entering from the vestibule section.

Still another object is to provide an assembly as described, the vestibule section of which has effective and swift means for urging a pig therethrough toward the tilting section and adapted to return to a position for permitting a pig to enter the vestibule section preparatory to urging another pig forward into the tilting section.

A further object is to provide an assembly having a tilting section which is adapted to grip a pig from each side in an effective manner without injury to the pig for holding the pig firmly while a rotating part of the tilting section is rotated until the pig is upside down in a position for treatment.

A particular object is to provide an effective tilting section which disposes the pig in an ideal position for inoculation, castration, ringing, or other treatments.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a side view of the vestibule section and the tilting section of my invention in operating position.

FIGURE 2 is a top view of the sections shown in FIGURE 1.

FIGURE 3 shows the pusher in retracted position with doors fully opened.

FIGURE 4 shows the pusher in partly advanced position with doors closed.

FIGURE 7 is a sectional view of the vestibule section showing the pusher in various positions. Dot-dash lines show the pusher in the retracted position; solid lines show the pusher partly advanced, and dotted lines show the pusher fully advanced.

FIGURE 8 is a mid-sectional view of the tilting section as indicated in FIGURE 1.

FIGURE 9 is a sectional view of the locking mechanism taken on line 9—9 of FIGURE 8.

In the following description of the construction and operation of this invention, like letters and numerals designate like parts in the several views.

Figure 5:
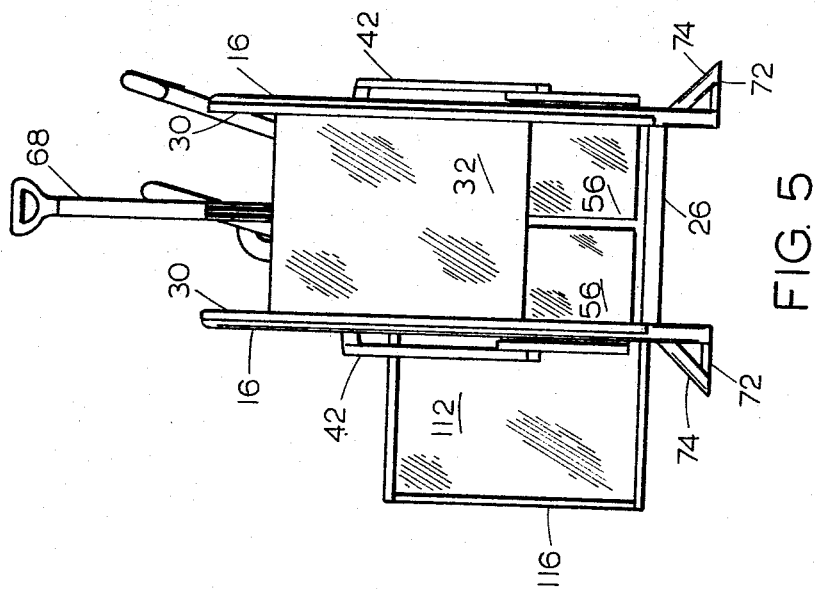
FIGURE 5 is the entrance end view of the vestibule section as shown in FIGURE 1.
Figure 10:
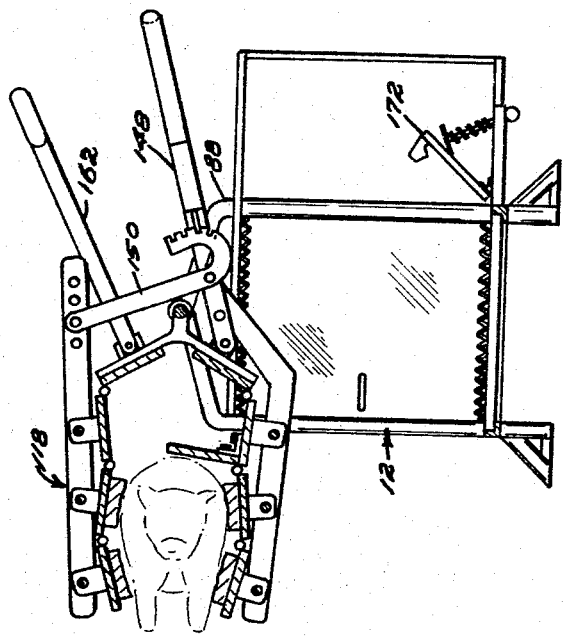
FIGURES 10 and 11 are views of the exit end of the tilting section similar to FIGURE 8 but showing the cradle in adjusted positions.
Figure 11:
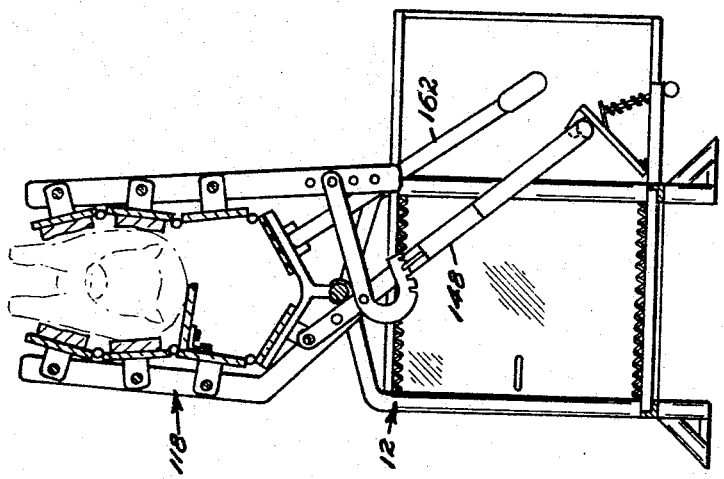

The vestibule section is broadly designated at 10, the tilting section as 12. The framework of 10 consists, in art, of two similar side frames 14 which, in turn, consists of the angle irons 16 and 18 rigidly joined in the form of a rectangle; longitudinal bars 20 are removably attached between the vertical members 16. The two side frames are rigidly joined by transverse bars 22 and 24 at the top and 26 at the bottom, as shown in FIGURES 2 and 5. The lower bars 18 and 26 support a floor 28, as shown in FIGURE 7.

Channel irons 30 are rigidly attached to the outer end members 16 to form tracks or guides for a vertically sliding door 32 which is raised to admit animals and lowered to exclude them by a cable 34 attached to the upper end of an arm 36 and running over a pulley 38 attached to a cross member 24; the cable 34, at its lower end, is attached to an eye 40 which is attached to the lower end of the door 32.

The lower end of the arm 36 is rigidly attached to the upper ends of a pair of large levers 42 which are rigidly joined by the shaft 44 which serves as an axle upon which said levers rotate. The shaft 44 rotates the bearings 46 which are rigidly attached to the upper members 18 of the side frames 14.

By means of the pins 48 and the straps 50, the lower ends of the levers 42 are rotatably connected with the bars 52 which are rigidly attached to the sliding members 54 slidably mounted on several of the longitudinal bars 20.

The doors 56 are hingedly mounted on the sliding members 54 and are free to swing forward to a position substantially parallel to the sides of the frame, as shown in FIGURE 3, but are arrested in their rearward movement at a point at right angles to the sides of the frame, as seen in FIGURE 4.

Two fingers 58 rigidly connected at one end to the end members 16 of the frames 14 and braced by the cross member 60 urge the doors 56 into the open position when the assembly of the sliding members 54 and the doors 56 is fully retracted, as shown in FIGURE 3.

As the above assembly is advanced in the direction of the arrow 62, the doors move out of contact with the said fingers 58 and are urged into a closed position by the springs 64, as seen in FIGURE 7. A bar 66 is connected rotatably to the approximate center of the arm 36 and in the same manner to the hand lever 68 which has a handle or grip at the upper end and at its lower end is mounted rotatably in a clevis 70 which is rigidly attached to an upper cross member 24 of the framework 10.

The feet 72 and the braces 74 at the lower ends of the vertical members 16 of the framework tend to give the framework greater stability upon the ground or a floor, as seen in FIGURE 5.

Diagonal braces 76 are rigidly attached at their upper ends to the upper ends of door guides 30 and at their lower ends to the upper angle irons 18 of the side frames tend to stiffen the said guides.

Vertical braces 78 between the upper longitudinal bars 20 and the upper angle irons 18 of the side frames, rigidly attached to both members, stiffen the upper part of the framework.

Referring to FIGURE 7, it will be seen that with the lever 68 and the door actuating mechanism in the retracted position (dot-dash lines) the sliding door 32 is fully raised and the swinging doors 56 are held open by the fingers 58 permitting an animal to enter the vestibule section, as shown in FIGURE 3.

As the lever 68 and the connected mechanism are moved toward the advanced position (solid lines), the sliding door 32 is permitted to drop, blocking the entrance of a following animal and the swinging doors 56 move away from contact with the fingers 58 and are urged into a closed position by the springs 64.

When the lever 68 and the connected mechanism are in the fully advanced position (dotted lines) the sliding door 32 is at its lowest position (fully closed) and the sliding members 54 and the swinging doors 56 have urged the animal out of the vestibule section 10 and into the tilting section 12. As the lever 68 and the connected mechanism are moved back to the retracted position (dot-dash lines), the doors 32 and 56 are again opened, as seen in FIGURE 3, permitting the entrance of another animal. The springs 80 cushion the return of the sliding member 54 to the retracted position, as shown in FIGURE 1.

When in operation, the vestibule section 10 and the tilting section 12 are rigidly but detachably joined by bolts at 82. A plate 84 serves as a bridge over the gap between the sections.

Figure 6:
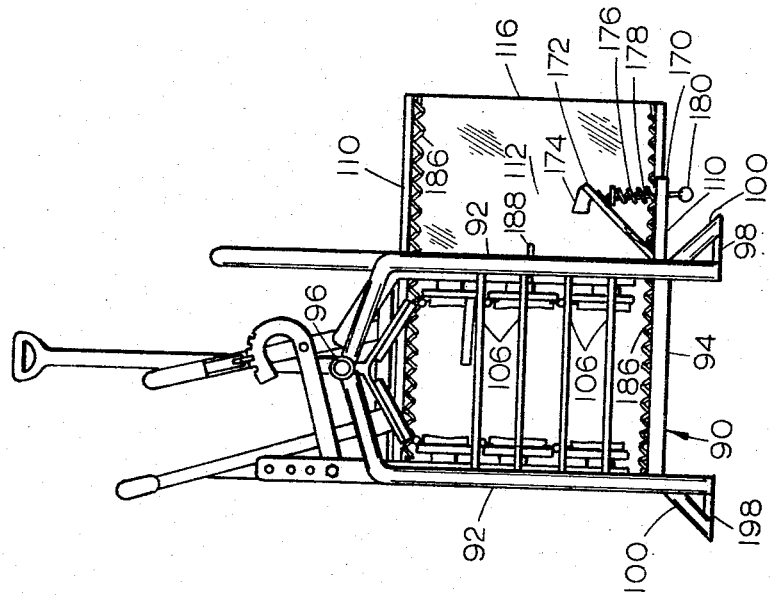
FIGURE 6 is the exit end view of the tilting section as shown in FIGURE 1.

The tilting section 12 consists, in part, of two similar end frames 88 and 90, each of which consists of two parallel side members 92 rigidly connected near the lower ends by a bar 94 and at the upper ends brought together, rigidly attached to, and supporting a bearing 96, the axis of which is at right angles to a plane intersecting the side members of the end frame. The feet 98, rigidly attached to the lower ends of the side members 92 and braced by the bars 100, extend from the outer ends of the feet to convenient points on the side members, and rigidly attached thereto, tend to stabilize the tilting section assembly, as seen in FIGURE 6.

At about the level of the bars 94, the end frames 88 and 90 are rigidly connected, facing each other, by longitudinal angle irons 102, which at one end extend beyond the end frame 90 and which are rigidly connected at their outer ends with the upper ends of the side members 92 by means of braces 104 which tend to stiffen the assembly.

Between the side members 92 of the end frame 90 are placed transverse bars 106 which prevent the animal from leaving the tilting section at that end, but which permit unobstructed vision ahead, luring the animal forward.

The floor 108, shown in FIGURE 8, is supported by bars 94 and angle irons 102. At the level of the floor 108 and also at the upper ends of the vertical portions of the side members 92 the channel irons 110 are rigidly attached to the end frame 88, the open sides facing each other. These channel irons extend beyond the side member of the end frame as shown in FIGURE 6 and serve as tracks for a horizontally sliding door 112 which controls the entrance of the animals into the tilting section. A brace 114, as seen in FIGURE 2, extends from the end of the lower channel iron to a convenient point on the angle iron 102 and is rigidly attached to both. These channel irons are also braced vertically by a bar 116 which is rigidly attached at its ends to the outer ends of the said channels.

The animal grasping and positioning mechanism, hereinafter named "cradle" 118, which is part of this invention, is suspended from the shaft 120 which is mounted in the bearing 96 and is free to rotate therein.

To the shaft 120 are rigidly attached, transversely and at their centers, the angle brackets 122, 124, and 126. To these brackets are rigidly attached the boards 128. To the outer edges of the boards 128 are hingeably attached the boards 130; to the lower edges of the boards 130 are hingeably attached the boards 132, and to the lower edges of the boards 132 are hingeably attached the boards 134. The boards 132 and 134 are lined with soft pads of rubber or other suitable material 136 to prevent injury or unnecessary discomfort to the animals.

A board 138 is rigidly attached at about a right angle, to one of the boards 130 which serves to hold the animal in the proper place with relation to boards 132 and 134. The mechanism which actuates the boards 130, 132, and 134 when grasping the animal consists, in part, of the bar 142 which is straight or nearly so and the bar 144, the upper end of which turns inward at an angle roughly parallel to one of the boards 128.

To the bars 142 and 144 are rotatably attached the lugs 146 which lugs are also rigidly attached to the boards 130, 132, and 134 at or near the centers of these boards; these lugs are of proper length to cause the said boards to conform to the contour of the animal when grasping it.

To the upper end of the bar 144 is rotatably attached the lower end of the lever 148, the upper end of which is formed into a handle.

A rigid U-shaped strap 150 is rotatably attached to the bar 142 and the lever 148 in such a manner that when the lever 148 is moved from the "open" position (dot-dash lines as shown in FIGURE 8) to the "closed" position (solid lines) the upper ends of the bars 142 and 144 are forced away from each other and, rotating upon their connections to the boards 130, urge the boards 132 and 134 inward to grasp the animal. The rotatable connections between the boards 132 and 134 and the bars 142 and 144 assist the said boards in conforming to the contour of the animal being held.

An extension of the strap 150 is formed to produce a ratchet having notches 152 to receive the pawl 154 which serve to hold the lever 148 in the desired position. The pawl 154, the upper end of which is formed into a handle, is held in engagement with the notches 152 by a spring 156 and is slidably attached to the lever 148 by a suitable retainer 158, shown in FIGURE 9.

A lever 162 is rigidly attached to angle the bracket 122 into a desired position. The upper end of the lever 162 is formed into a handle. Drawing the handle 162 in the direction of the arrow 164 positions the cradle at any point within an arc of 180 degrees.

Upon a bar 17, rigidly attached to the angle irons 102, is hingeably mounted a bar 172 to which, at the end opposite the hinge, a hook 174 is rigidly attached. This hook, by engaging projections properly located on the lever 148 or the mechanism attached thereto, holds the cradle in place as the animal is held, for servicing, either upon its side, or upon its back. A spring 176 mounted on the rod 178 serves to control the movement and the positioning of the bar 172. A nut 180 on the lower end of the rod 178 serves as a stop.

The horizontally sliding door 112 is normally held in the closed position by the springs 186 attached at one end to the outer corners of the said door and at the other end to the end frame 88 at points opposite to the points at which the springs are fastened to the door. At or near the inner edge of the door 112, there is rigidly attached to the door a stud 118 which engages one of the boards 132. When the cradle is in the "loading" or open position, as shown in FIGURE 6, the said board, through its contact with the stud 188, urges the door 112 into the open position permitting the entrance of an animal into the tilting section. As the cradle is closed and the tilting section is rotated in the direction of the arrow 164, as seen in FIGURE 8, the board 132 moves out of engagement with the stud 188 permitting the springs 186 to close the door 112, thus preventing a following animal from entering the tilting section until the animal presently in it has been serviced and discharged and the tilting section returned to the loading position.

An animal is discharged from the tilting section by positioning the cradle so that the opening between the two lower boards 134 just clears the floor 108 and then opening or releasing the animal grasping mechanism, depositing the animal on the floor or ground, a drop of only a few inches.

From the foregoing description, it is thought to be obvious that a pig holding assembly constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A pig handling assembly comprising: a vestibule section and a pig tilting section, said vestibule section comprising a framework having sides defining an elongated chute therebetween having an entrance end and an exit end, sliding members mounted on said framework on each side of said chute in a manner for permitting said sliding members to move longitudinally of said chute, swinging doors hingedly secured to said sliding members respectively and extending transversely of said chute when in closed pig-pushing positions, means urging said doors toward closed positions, means attached to said frame for engaging said doors and causing said doors to open as said sliding members are moved toward said chute entrance, a hand lever pivotally mounted on said frame, means attaching said hand lever to said sliding members for urging them toward said entrance and exit as said hand lever is moved in each of two directions, an entrance door moveably mounted on said frame for opening and closing said entrance, said pig tilting section having means for gripping an upright pig and turning said pig upsde down to be treated.

2. The combination of claim 1 in further combination with means interconnecting said entrance door and said hand lever for causing said entrance door to be opened when said hand lever is moved in a direction for urging said sliding members toward said exit.

3. The combination of claim 1 in which said pig tilting section gripping means comprises side walls on each side of a pig space, said side walls having sections disposed one above another, said side wall sections having adjacent edges respectively secured together for pivoting about horizontal axes, means for actuating said side wall sections to cause them to press inwardly against a pig for holding said pig.

4. The combination of claim 3 in which said means for actuating said side wall sections comprises a lever, a sector, sector means to which said lever is pivotally connected, releasable means on said lever engaging said sector, and means interconnecting said sector means and a lower end of said lever to opposite ones of said side walls respectively, whereby a movement of said lever will press said side walls against a pig.

5. A pig handling assembly as described in claim 3 in which said side walls are provided with a member extending transversely therebetween for preventing a small pig from slipping excessively far toward the attached ends of the sides so that a small pig is presented in an upside down position close to the free ends of the sides where it can be easily reached.

References Cited by the Examiner

UNITED STATES PATENTS

| | | | |
|---|---|---|---|
| 902,638 | 11/1908 | Allison | 119—99 |
| 1,114,094 | 10/1914 | Apple | 119—99 |
| 1,436,897 | 11/1922 | Novak | 119—99 |
| 1,444,769 | 2/1923 | Abernathy | 119—99 |
| 1,701,902 | 2/1929 | Weinberg | 17—1 |
| 2,521,487 | 9/1950 | Seyler | 119—99 |
| 2,700,957 | 2/1955 | Keirsey | 119—103 |
| 2,753,842 | 7/1956 | Thorson | 119—103 |
| 3,237,602 | 3/1966 | Rens | 119—98 |

SAMUEL KOREN, *Primary Examiner.*

ALDRICH F. MEDBERY, *Examiner.*